US008553889B2

(12) United States Patent
Furukawa et al.

(10) Patent No.: US 8,553,889 B2
(45) Date of Patent: Oct. 8, 2013

(54) MIX-NET SYSTEM

(75) Inventors: Jun Furukawa, Tokyo (JP); Kazue Sako, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/491,727

(22) Filed: Jun. 8, 2012

(65) Prior Publication Data

US 2012/0250868 A1 Oct. 4, 2012

Related U.S. Application Data

(62) Division of application No. 12/684,192, filed on Jan. 8, 2010, now Pat. No. 8,223,973, which is a division of application No. 10/546,645, filed as application No. PCT/JP2005/000841 on Jan. 24, 2005, now Pat. No. 7,672,460.

(30) Foreign Application Priority Data

Jan. 22, 2004   (JP) .................................. 2004-014560

(51) Int. Cl.
*H04L 9/00* (2006.01)
(52) U.S. Cl.
USPC ............... 380/281; 380/28; 380/30; 380/277; 380/284; 380/285; 713/168; 713/180; 713/181; 726/2
(58) Field of Classification Search
USPC ...................... 380/28, 30, 277, 281, 284, 285; 713/168, 180, 181; 726/2
See application file for complete search history.

(56) References Cited

U.S. PATENT DOCUMENTS

| 6,044,463 A | 3/2000 | Kanda et al. |
| 6,341,349 B1 | 1/2002 | Takaragi et al. |
| 7,941,667 B2 * | 5/2011 | Miyazaki et al. ............. 713/176 |

FOREIGN PATENT DOCUMENTS

| JP | 2000-235342 A | 8/2000 |
| JP | 2002-259621 A | 9/2002 |
| JP | 2002-344445 | 11/2002 |
| JP | 2004-013606 A | 1/2004 |

OTHER PUBLICATIONS

Markus Jakobsson, et al; "An Optimally Robust Hybrid Mix Network (Extended Abstract);" Proceedings of the 20th annual ACM Symposium on Principles of Distributed Computation: 2001.
International Search Report with English Language Translation issued for the parent PCT Application.

* cited by examiner

*Primary Examiner* — Edward Zee
*Assistant Examiner* — Baotran N To
(74) *Attorney, Agent, or Firm* — Dickstein Shapiro LLP

(57) ABSTRACT

Each participant apparatus (103) encrypts a plaintext by using a secret key of secret key cryptography, encrypts the encryption key by a public key, and sends the plaintext and public key to a substitution/decryption apparatus (112). With this processing, the limitation on the length of a ciphertext to be processed can be eliminated. In this invention, a verifiable proof text using a public key by each substitution/decryption apparatus is verified by a verification apparatus (109) by using the public key. If one of a plurality of organizations to decrypt and shuffle ciphertexts has not correctly executed the operation, a third party can specify it and prove that the specified organization is unauthorized.

4 Claims, 5 Drawing Sheets

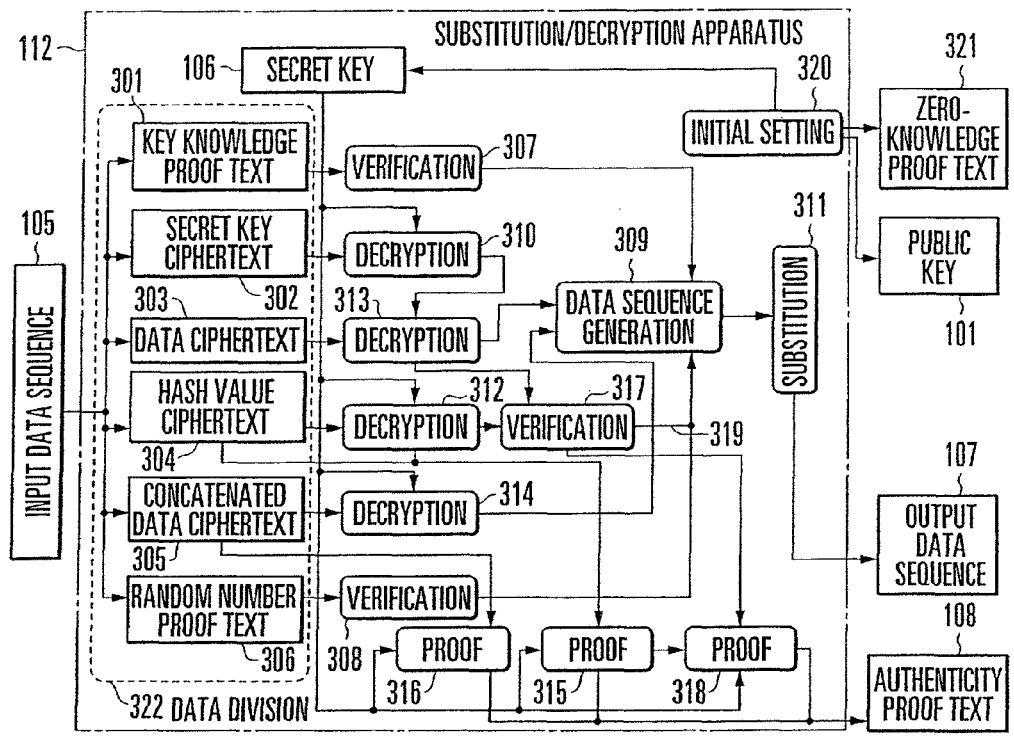
F I G. 3
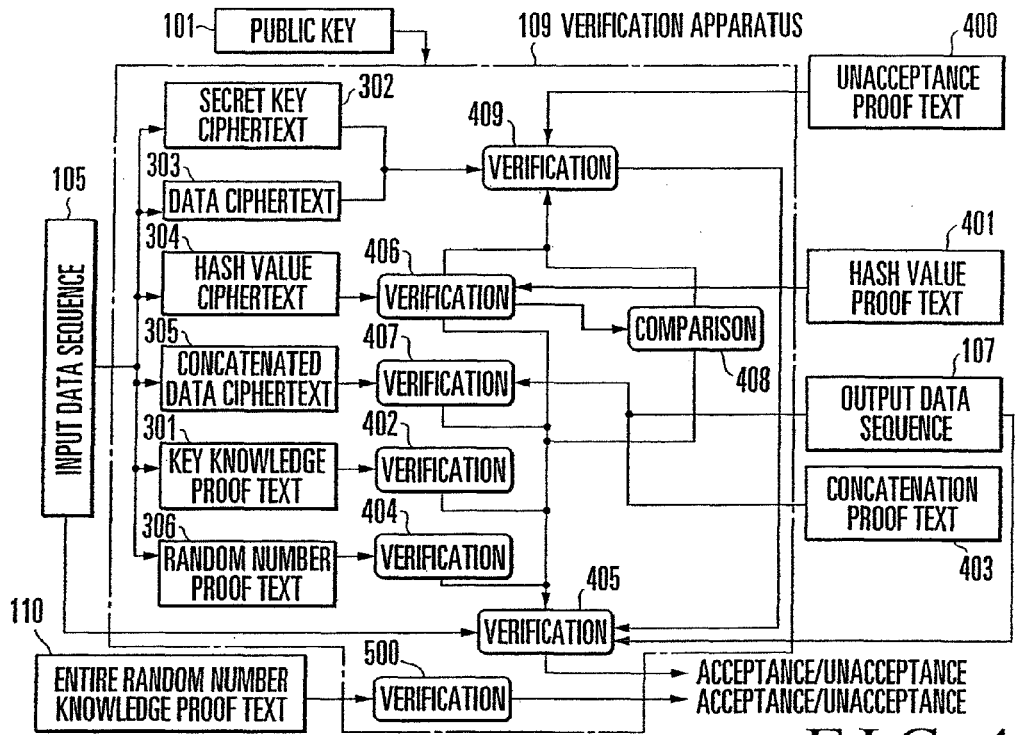
F I G. 4

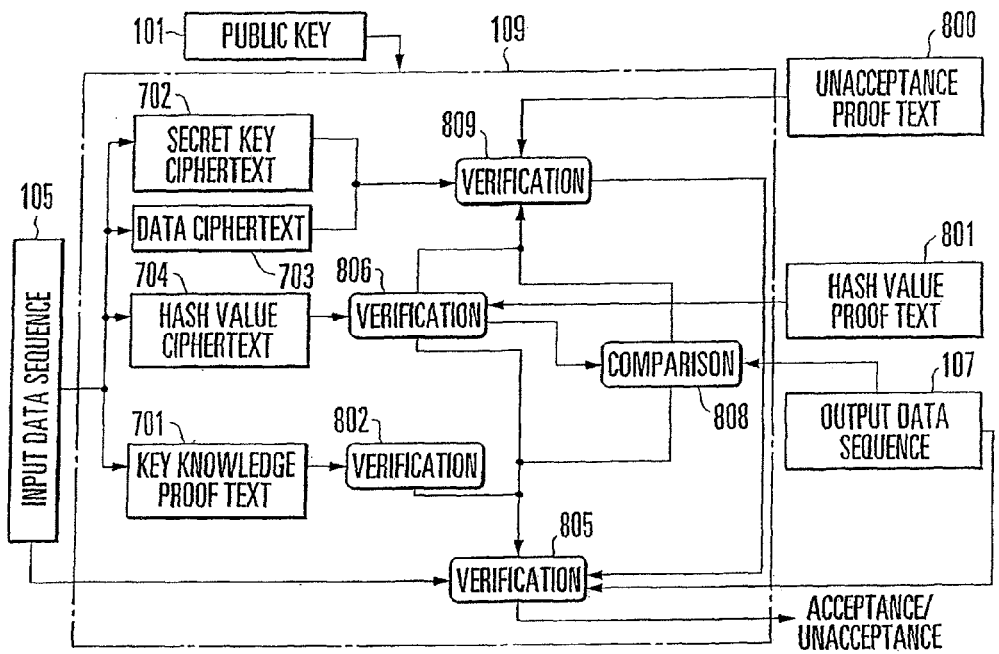
F I G. 7
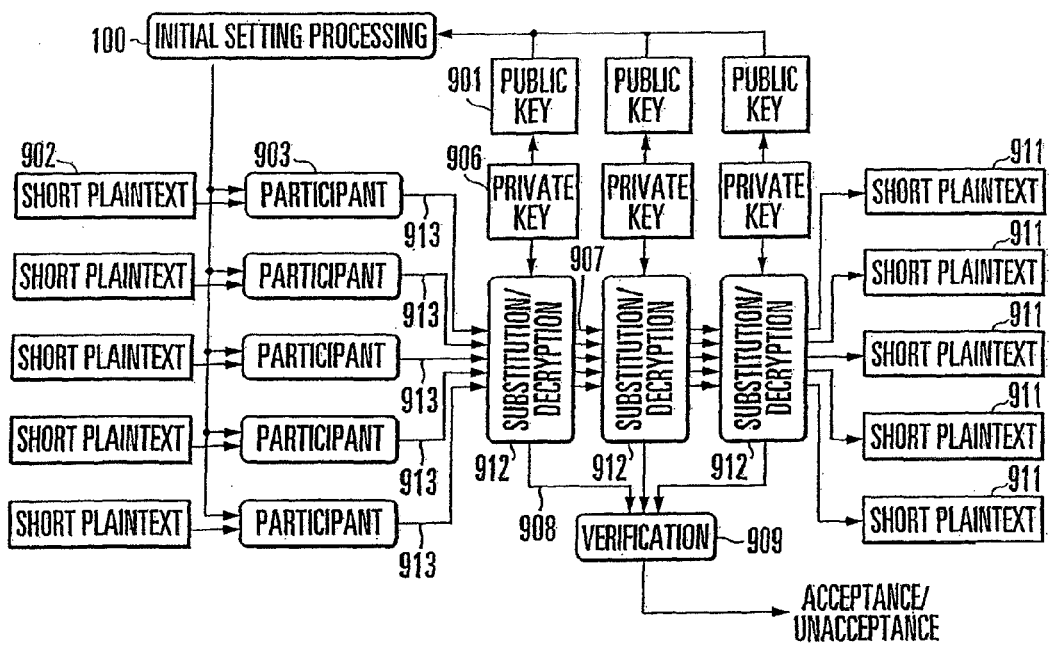
PRIOR ART    F I G. 8

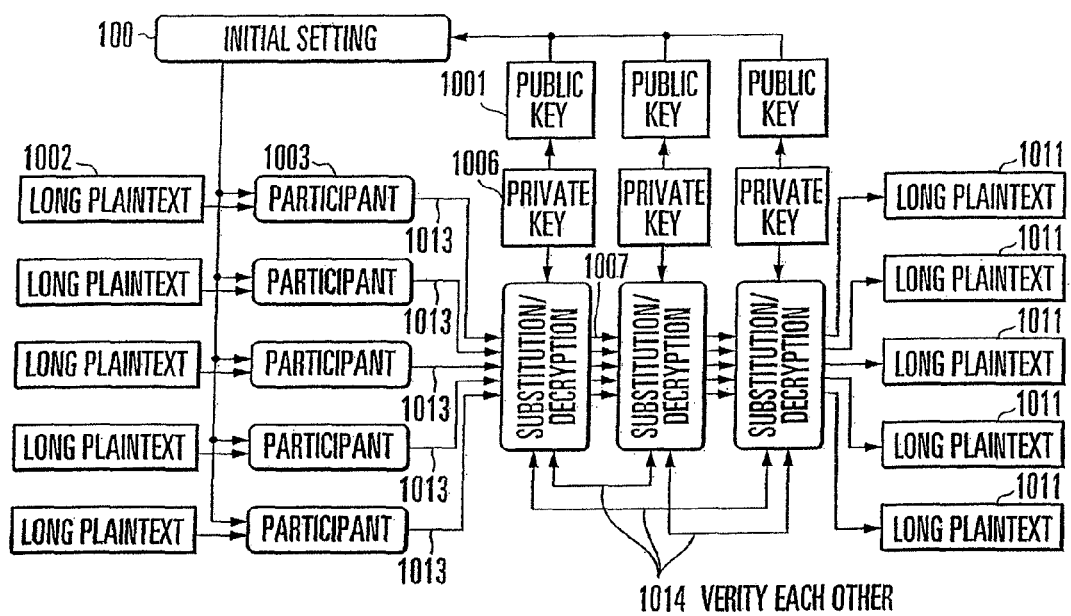
PRIOR ART    FIG. 9

US 8,553,889 B2

MIX-NET SYSTEM

CROSS REFERENCE TO RELATED APPLICATION

This application is a divisional of U.S. patent application Ser. No. 12/684,192 filed Jan. 8, 2010, which is a divisional of U.S. Pat. No. 7,672,460 issued on Mar. 2, 2010, which the national phase application under 35 U.S.C. §371 of International Patent Corporation Treaty No. PCT/JP05/000841, filed Jan. 24, 2005, which in turn claims priority to Japanese Patent Application No. JP2004-014560, filed Jan. 22, 2004. The contents of each of these applications is incorporated by reference herein.

TECHNICAL FIELD

The present invention relates to a mix-net technology of causing a plurality of organizations to, in cooperation with each other, shuffle and decrypt a plurality of input ciphertexts and output data whose correspondence with the input ciphertexts is unnoticeable and, more particularly, to a technique of eliminating the limitation on the length of an input ciphertext and, if one of a plurality of organizations has not executed the correct operation, allowing even a third party to specify it and prove that fact.

BACKGROUND ART

Mix-net is an operation of substituting and decrypting the elements of an input ciphertext sequence such that the correspondence between the elements of an output decrypted text sequence and those of the input ciphertext sequence becomes unnoticeable.

PRIOR ART (1)

In a conventional mix-net, a method using a proof apparatus and a verification apparatus is used to make it possible to specify an organization which has not executed the correct operation and specify the fact (e.g., Japanese Patent Laid-Open No. 2002-344445 (reference 1)). This method will be described with reference to FIG. 8.

The proof apparatus of reference 1 proves that substitution and decryption are correctly done. The verification apparatus of reference 1 verifies that the proof executed by the proof apparatus is correct. With the functions of the two apparatuses, if the proof apparatus does not execute the correct operation (substitution and decryption), proof fails, and the verification apparatus can determine that the proof apparatus has not correctly operated.

The proof apparatus and verification apparatus of reference 1 are used in the following way and operated as a mix-net as a whole. First, a private key 906 is determined in correspondence with each substitution/decryption apparatus 912. A public key 901 is generated from the private key 906 and distributed to all participant apparatuses 903. Each participant apparatus 903 encrypts a short plaintext 902 having a predetermined length by using the public key 901.

Each substitution/decryption apparatus 912 substitutes and decrypts an input ciphertext sequence 913 and transfers it to the next substitution/decryption apparatus 912 (processing 907). This operation is repeated to finally obtain a plaintext sequence 911. The substitution/decryption apparatus 912 proves by using the proof apparatus of reference 1 that the substitution and decryption operations executed by itself are correct (processing 908). A verification apparatus 909 verifies, by using the verification apparatus of reference 1, the proof executed by the substitution/decryption apparatus. Even a third party can execute this verification when it can prepare the verification apparatus.

In the above method, the length of the plaintext 902 that the participant apparatus 903 can encrypt is limited to almost the same as the length of the public key. Hence, a longer plaintext cannot be processed.

PRIOR ART (2)

In another conventional mix-net, a method by Juels and Jakobsson is used to make it possible to process a ciphertext having an arbitrary length (e.g., "An Optimally Robust Hybrid Mix Network, Proc. of the 20th annual ACM Symposium on Principles of Distributed Computation, 2001" (reference 2)). In this method, a ciphertext to be input is created by encrypting a plaintext by arbitrary secret key cryptography. Hence, the length of the plaintext is not particularly limited. Additionally, in this method, if one of a plurality of organizations to decrypt and shuffle ciphertexts has not correctly executed these operations, it can be specified by the organizations which execute encryption and shuffle in cooperation. However, a third party not in cooperation with the plurality of organizations cannot specify the organization which has not correctly execute the ciphertext operation.

The above relationship will be described with reference to FIG. 9. The mix-net of reference 2 operates in almost the same way as the mix-net of the 100 prior art (1) except that a long plaintext 1002 may be input. In addition, the substitution/decryption apparatuses can verify each other whether substitution and decryption have been done correctly (processing 1014). However, any third party cannot verify it, unlike the prior art (1).

DISCLOSURE OF INVENTION

Problems to be Solved by the Invention

In the prior art (1), if one of a plurality of organizations to decrypt and shuffle ciphertexts has not correctly executed these operations, a third party can specify it and prove that the specified organization is unauthorized. On the other hand, this method has a problem that the processible length of a ciphertext is limited.

In the prior art (2), the processible length of a ciphertext is not limited. However, there is a problem that if one of a plurality of organizations to decrypt and shuffle ciphertexts has not correctly executed these operations, any third party can specify it by itself.

It is an object of the present invention to allow a third party to specify an unauthorized organization when decryption and shuffle of ciphertexts are done by a plurality of organizations.

It is another object of the present invention to eliminate the limitation on the length of a ciphertext.

Means of Solution to the Problems

A participant apparatus according to the present invention is characterized by comprising:

key encryption means for encrypting one of a plurality of secret keys of secret key cryptography by one public key of a plurality of substitution/decryption apparatuses;

data encryption means for encrypting given data by one of the plurality of secret keys of the secret key cryptography;

hash value encryption means for calculating a hash value of the given data by using a cryptographic hash function and encrypting the hash value by one public key of the plurality of substitution/decryption apparatuses;

repeat means for repeating processing of inputting a plaintext as a first input to the data encryption means and inputting, as subsequent inputs to the data encryption means, preceding outputs from the data encryption means, the key encryption means, and the hash value encryption means a number of times equal to the number of substitution/decryption apparatuses; and output means for outputting data obtained by processing of the repeat means.

A consolidating apparatus according to the present invention is characterized by comprising an arrangement which receives a plurality of data, verifies authenticity of each of the data, and outputs only data which is determined as authentic.

A substitution/decryption apparatus according to the present invention is characterized by comprising:

data division means for diving each element of an input data sequence into a secret key of secret key cryptography, which is encrypted by public key cryptography, data encrypted by secret key cryptography, and a hash value encrypted by public key cryptography;

secret key decryption means for decrypting the encrypted secret key of the secret key cryptography by a private key of the public key cryptography;

data decryption means for decrypting the encrypted data by using the decrypted secret key to generate output data;

hash value decryption means for outputting a value obtained by decrypting the encrypted hash value by the private key of the public key cryptography;

hash value verification means for comparing the decrypted hash value with a hash value of the generated output data, if the values coincide, outputting hash value acceptance, and if the values do not coincide, outputting hash value unacceptance;

output data sequence generation means for generating a data sequence which contains, as sequence elements, only the output data for which acceptance is output from the hash value verification means and which are corresponding in a sense of being generated from the same element data of the input data sequence, and uniformly shuffling the elements at random to form an output data sequence;

hash value decryption authenticity proof means for generating a hash value decryption authenticity proof text as a proof text which proves that the hash value of each element of the output data sequence is always a value obtained by decrypting the encrypted hash value contained in a certain element of the input data sequence, and the hash values are in a one-to-one correspondence;

hash value unacceptance authenticity proof means for generating a hash value unacceptance authenticity proof text as a proof text which proves, when the hash value verification means outputs unacceptance, that the output of unacceptance is authentic; and output means for creating an authenticity proof text from the hash value decryption authenticity proof text and the hash value unacceptance authenticity proof text and outputting the authenticity proof text and the output data sequence output from the output data sequence generation means.

A verification apparatus according to the present invention is characterized by comprising:

hash value decryption authenticity verification means for verifying that a decrypted hash value contained in a hash value decryption authenticity proof text coincides with a hash value obtained by decrypting an encrypted hash value of a certain element of an input data sequence, and the hash values are in a one-to-one correspondence, if the hash values coincide and are in the one-to-one correspondence, outputting acceptance, and if the hash values are not in the one-to-one correspondence, outputting unacceptance;

hash value coincidence verification means for, when the decrypted hash value coincides with a hash value of each element of an output data sequence, outputting acceptance, and if the hash values do not coincide, outputting unacceptance;

hash value unacceptance authenticity verification means for verifying a hash value unacceptance authenticity proof text as a proof text which proves that for an element of the elements of the input data sequence, which corresponds to a hash value for which the hash value coincidence verification means outputs unacceptance, the output of unacceptance is authentic, if the proof text is authentic, outputting acceptance, and if the proof text is unauthentic, outputting unacceptance; and authenticity determination means for outputting acceptance, for the element of the input data sequence, if the hash value decryption authenticity verification means outputs acceptance while the hash value coincidence verification means outputs acceptance, or if the hash value coincidence verification means outputs unacceptance while the hash value unacceptance authenticity verification means outputs acceptance, and if the output data sequence contains only data corresponding to the elements accepted by the hash value coincidence verification means and all the data, and otherwise, outputting unacceptance.

A mix-net system according to the present invention is characterized by comprising the plurality of participant apparatuses, the consolidating apparatus, the substitution/decryption apparatuses, and the verification apparatus, the system executing initial setting processing of generating and publishing a safety variable, an area variable of the public key cryptography, the cryptographic hash function, and an encryption function of the secret key cryptography, initial setting processing of generating and publishing the public key of each of the plurality of substitution/decryption apparatuses, participation processing of inputting, to each of the participant apparatuses, the safety variable, the area variable of the public key cryptography, the cryptographic hash function, the encryption function of the secret key cryptography, the public key of each of the plurality of substitution/decryption apparatuses, a plurality of secret keys of the secret key cryptography, and a plaintext which is different for each participant, and causing each of the participant apparatuses to output data to be input to the substitution/decryption apparatuses, consolidation processing of inputting all the data to be input to the substitution/decryption apparatuses, which are obtained by the participation processing, to the consolidating apparatus and inputting an output from the consolidating apparatus as the input data sequence, substitution/decryption processing of inputting the input data sequence and the private key of the public key cryptography to one of the substitution/decryption apparatuses and causing the substitution/decryption apparatus to output the output data sequence and a sequence of an authenticity proof text, integrated substitution/decryption processing of repeatedly executing the substitution/decryption processing while exchanging the substitution/decryption apparatus to be used by inputting an input data sequence as an output of the consolidation processing as a first input data sequence, in which an input data sequence in first substitution/decryption processing is an input data sequence output from the consolidation processing, an input data sequence in subsequent substitution/decryption processing is an output data sequence of immediately preceding substitution/decryption processing, an output data sequence output from final substitution/decryption processing is a decryption result, an output data sequence output from each substitution/decryption processing except the final substitution/decryption processing is an in-progress decryption result, the authenticity proof texts output from all the substitution/decryption processing operations are defined as a global authenticity proof text, and the decryption result, the in-progress decryption results, and the global authenticity proof text are output, verification processing of separating an input and output of each substitution/decryption apparatus from the decryption result, the in-progress decryption results, and the global authenticity proof text, inputting the input data sequence, the output data sequence, and the authenticity proof text of each substitution/decryption processing to the verification apparatus, and causing the verification apparatus to output one of acceptance and unacceptance, and mix-net determination processing of collecting outputs of the verification processing for all substitution/decryption processing operations, if all results indicate acceptance, outputting acceptance, and otherwise, outputting unacceptance.

Effect of the Invention

In the present invention, each participant apparatus encrypts a plaintext by using a secret key of secret key cryptography, encrypts the encryption key by a public key, and sends the plaintext and public key to a substitution/decryption apparatus. With this processing, the limitation on the length of a ciphertext to be processed can be eliminated.

In the present invention, a verifiable proof text using a public key by each substitution/decryption apparatus is verified by a verification apparatus using the public key. If one of a plurality of organizations to decrypt and shuffle ciphertexts has not correctly executed the operation, a third party can specify it and prove that the specified organization is unauthorized.

BRIEF DESCRIPTION OF DRAWINGS

FIG. 3 is a block diagram showing an arrangement example of a substitution/decryption apparatus according to the first embodiment of the present invention;

FIG. 4 is a block diagram showing an arrangement example of a verification apparatus according to the first embodiment of the present invention;

FIG. 7 is a block diagram showing an arrangement example of a verification apparatus according to the second embodiment of the present invention;

FIG. 8 is a block diagram for explaining the prior art (1); and

FIG. 9 is a block diagram for explaining the prior art (2).

BEST MODE FOR CARRYING OUT THE INVENTION

The embodiments of the present invention will be described next in detail with reference to the accompanying drawings.

First Embodiment 1.1 Outline

The outline of the first embodiment will be described with reference to FIGS. 1 to 4.

Figure 1:
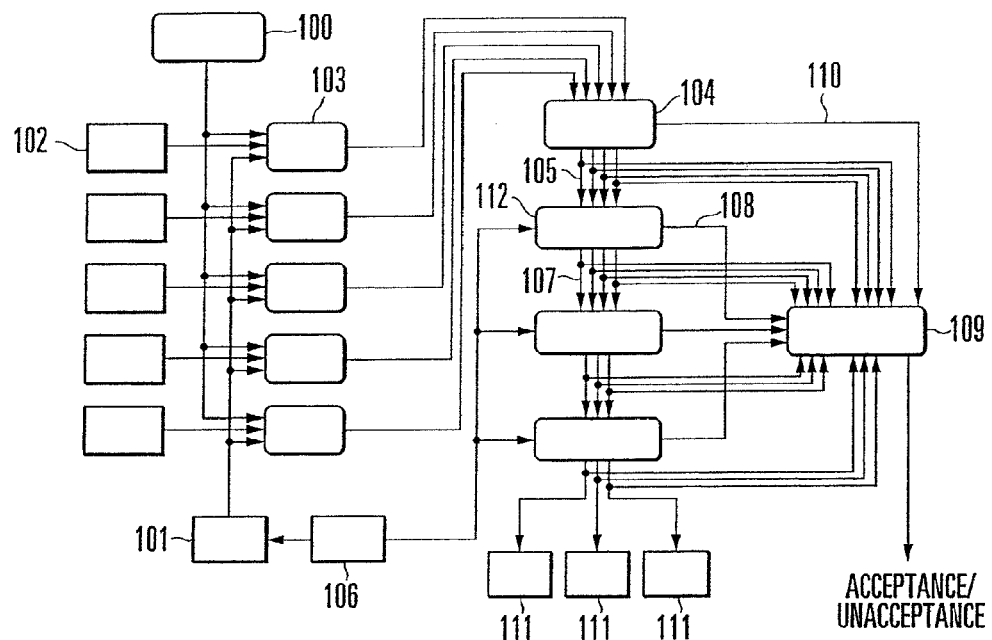
FIG. 1 is a block diagram showing the overall arrangement of a mix-net system according to the present invention.

As shown in FIG. 1, a mix-net system according to this embodiment includes a plurality of participant apparatuses 103, a consolidating apparatus 104, a plurality to substitution/decryption apparatuses 112, and a verification apparatus 109.

[Participant Apparatus]

Figure 2:
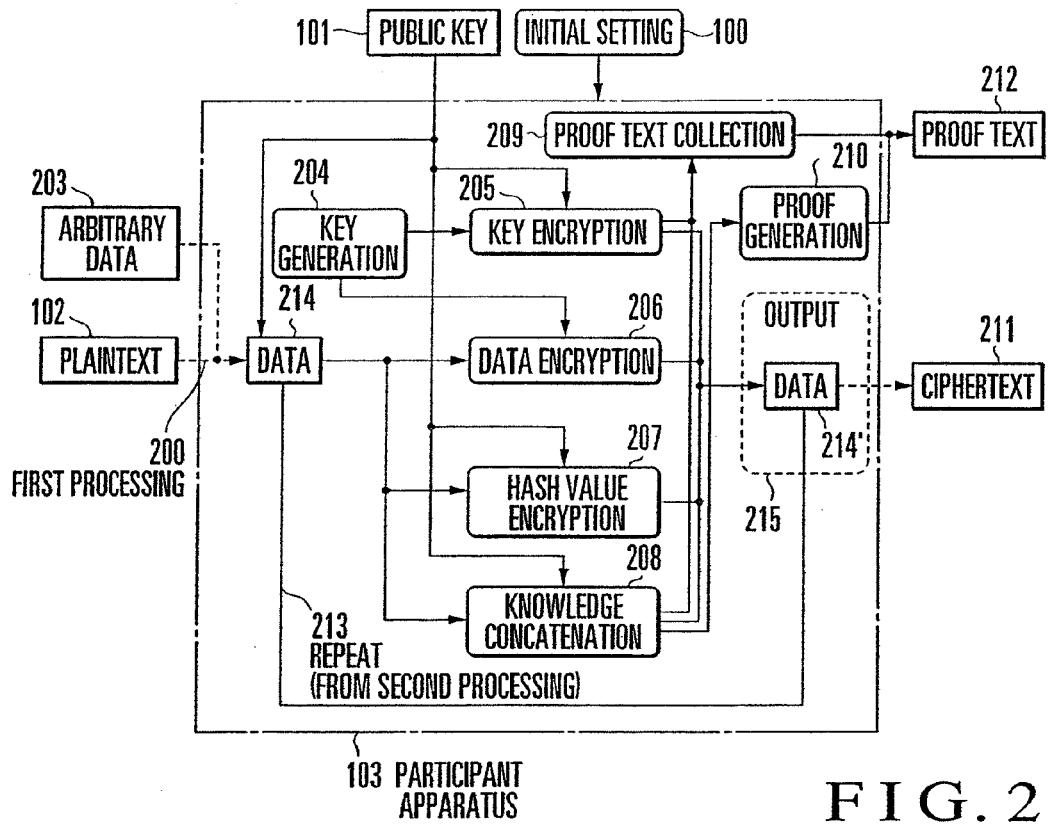
FIG. 2 is a block diagram showing an arrangement example of a participant apparatus according to the first embodiment of the present invention.
Figure 5:
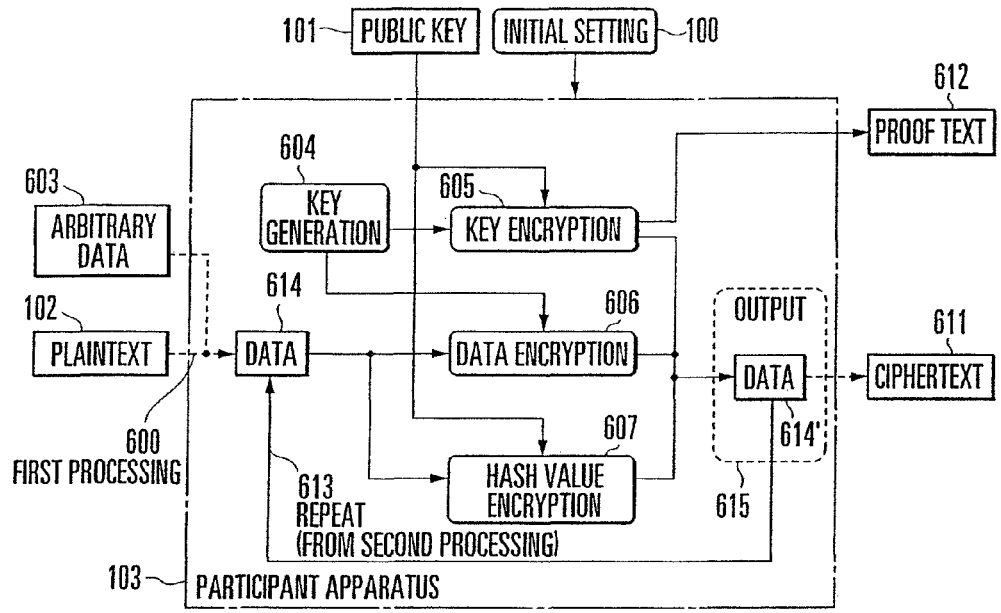
FIG. 5 is a block diagram showing an arrangement example of a participant apparatus according to the second embodiment of the present invention.

As shown in FIG. 2, the participant apparatus 103 has a key encryption means 205, data encryption means 206, hash value encryption means 207, knowledge concatenation means 208, repeat means 213, random number knowledge proof means 210, and output means 215.

The key encryption means 205 encrypts one of a plurality of secret keys of secret key cryptography by using one public key 101 of the plurality of substitution/decryption apparatuses 112. The key encryption means 205 also generates a proof text of knowledge of the secret key encrypted at this time. The data encryption means 206 encrypts given data 214 by using one of the plurality of secret keys of secret key cryptography. The hash value encryption means 207 calculates the hash value of the given data by using a cryptographic hash function and encrypts the hash value by using one public key of the plurality of substitution/decryption apparatuses 112. The knowledge concatenation means 208 encrypts the given data 214 by using the public key 101 of the plurality of substitution/decryption apparatuses 112. The knowledge concatenation means 208 also generates a proof text of knowledge of a secret random number used for encryption at this time.

The repeat means 213 repeats processing of inputting a plaintext 102 as the first input to the data encryption means 206 and inputting, as subsequent inputs to the data encryption means 206, preceding outputs from the data encryption means 206, key encryption means 205, hash value encryption means 207, and knowledge concatenation means 208 a number of times equal to the number of substitution/decryption apparatuses 112. The whole random number knowledge proof means 210 generates and outputs a proof text of knowledge of the sum of secret random numbers used in all the repeated processing operations for data finally obtained by repeating the processing by the knowledge concatenation means 208. The output means 215 outputs, as a ciphertext 211, data obtained by the processing of the repeat means 213. The output means 215 also outputs data to prove that an authentic participant apparatus has created the ciphertext 211.

[Consolidating Apparatus]

The consolidating apparatus 104 receives, from each of the plurality of participant apparatuses 103, the ciphertext 211 and the data to prove that an authentic participant apparatus has created the ciphertext 211. The consolidating apparatus 104 verifies that the input ciphertext 211 has been generated by an authentic participant apparatus and outputs only ciphertexts determined as authentic to one of the substitution/decryption apparatuses 112.

[Substitution/Decryption Apparatus]

As shown in FIG. 3, the substitution/decryption apparatus 112 has a data division means 322, secret key knowledge verification means 307, secret random number knowledge verification means 308, secret key decryption means 310, data decryption means 313, hash value decryption means 312, hash value verification means 317, concatenated data decryption means 314, output data sequence generation means 311, hash value decryption authenticity proof means 315, concatenated data decryption authenticity proof means 316, hash value unacceptance authenticity proof means 318, and output means.

The data division means 322 divides each element of an input data sequence 105 input from the consolidating apparatus 104 or another substitution/decryption apparatus into a secret key 302 of secret key cryptography, which is encrypted by public key cryptography, data 303 encrypted by secret key cryptography, a hash value 304 encrypted by public key cryptography, concatenated data 305 encrypted by public key cryptography, a proof text 301 of knowledge of the encrypted secret key, and a proof text 306 of knowledge of secret random numbers used to encrypt concatenated data.

The secret key knowledge verification means 307 verifies the authenticity of the proof text 301 of knowledge of the secret key. If the proof text 301 is authentic, acceptance is output. Otherwise, unacceptance is output. The secret random number knowledge verification means 308 verifies the authenticity of the proof text 306 of knowledge of the secret random number. If the proof text 306 is authentic, acceptance is output. Otherwise, unacceptance is output. The secret key decryption means 310 decrypts the encrypted secret key of secret key cryptography by using a private key 106 of public key cryptography. The data decryption means 313 decrypts the encrypted data 303 by using the decrypted secret key to generate output data. The hash value decryption means 312 outputs a hash value obtained by decrypting the encrypted hash value 304 by using the private key 106 of public key cryptography. The hash value verification means 317 compares the decrypted hash value with the hash value of the generated output data. If the values coincide, hash value acceptance is output. If the values do not coincide, hash value unacceptance is output. The concatenated data decryption means 314 decrypts the encrypted concatenated data 305 by using the private key of public key cryptography.

The output data sequence generation means 311 generates a data sequence which contains, as sequence elements, only output data and decrypted concatenated data for which acceptance is output from all of the hash value verification means 317, secret key knowledge verification means 307, and secret random number knowledge verification means 306 and which are corresponding in a sense of being generated from the same element data of the input data sequence 105. The output data sequence generation means 311 also uniformly shuffles the elements at random to form an output data sequence 107.

The hash value decryption authenticity proof means 315 generates a hash value decryption authenticity proof text which proves that the hash value of each element of the output data sequence 107 is always a value obtained by decrypting an encrypted hash value contained in a certain element of the input data sequence 105, and the hash values are in a one-to-one correspondence. The concatenated data decryption authenticity proof means 316 generates a concatenated data decryption authenticity proof text which proves that the decrypted concatenated data contained in each element of the output data sequence 107 is always data obtained by decrypting encrypted concatenated data contained in a certain element of the input data sequence 105, and the concatenated data are in a one-to-one correspondence. The hash value unacceptance authenticity proof means 318 generates a hash value unacceptance authenticity proof text which proves that output of unacceptance from the hash value verification means 317 is authentic.

The output means creates an authenticity proof text 108 from the hash value decryption authenticity proof text, concatenated data decryption authenticity proof text, and hash value unacceptance authenticity proof text and outputs the authenticity proof text 108 and the output data sequence 107 output from the output data sequence generation means 311.

[Verification Apparatus]

As shown in FIG. 4, the verification apparatus 109 has a secret key knowledge verification means 402, secret random number knowledge verification means 404, hash value decryption authenticity verification means 406, hash value coincidence verification means 408, concatenated data decryption authenticity verification means 407, hash value unacceptance authenticity verification means 409, and authenticity determination means 405.

The secret key knowledge verification means 402 verifies the authenticity of the secret key knowledge proof text 301 belonging to each element of the input data sequence 105 input from the consolidating apparatus 104 or substitution/decryption apparatus 112. If the proof text 301 is authentic, acceptance is output. Otherwise, unacceptance is output. The secret random number knowledge verification means 404 verifies the secret random number knowledge proof text 306 belonging to each element of the input data sequence 105. If the proof text 306 is authentic, acceptance is output. Otherwise, unacceptance is output. The hash value decryption authenticity verification means 406 verifies whether the decrypted hash value contained in a hash value decryption authenticity proof text 401 coincides with a hash value obtained by decrypting the encrypted hash value of a certain element of the input data sequence 105, and the hash values are in a one-to-one correspondence. If the hash values coincide and are in a one-to-one correspondence, acceptance is output. Otherwise, unacceptance is output.

The hash value coincidence verification means 408 outputs acceptance when the decrypted hash value coincides with the hash value of each element of the output data sequence 107 from the substitution/decryption apparatus 112. Otherwise, unacceptance is output. The concatenated data decryption authenticity verification means 407 verifies whether decrypted concatenated data contained in each element of the output data sequence 107 coincides with data obtained by decrypting the encrypted concatenated data 305 contained in a certain element of the input data sequence 105, and the concatenated data are in a one-to-one correspondence. If the concatenated data coincide and are in a one-to-one correspondence, acceptance is output. Otherwise, unacceptance is output. For, of the elements of the input ciphertext sequence 303, an element corresponding to a hash value for which unacceptance is output from the hash value coincidence verification means 408, the hash value unacceptance authenticity verification means 409 verifies a hash value unacceptance authenticity proof text 400 which proves that the output of unacceptance is authentic. If the proof text is authentic, acceptance is output. Otherwise, unacceptance is output.

For, of the elements of the input data sequence 105, all elements for which both the secret key knowledge verification means 402 and the secret random number knowledge verification means 404 output acceptance, the authenticity determination means 405 outputs acceptance if all the following conditions are satisfied. Otherwise, unacceptance is output.

(A) Both the hash value decryption authenticity verification means 406 and the concatenated data decryption authenticity verification means 407 output acceptance.

(B) The hash value coincidence verification means 408 outputs acceptance, or the hash value coincidence verification means 408 outputs unacceptance while the hash value unacceptance authenticity verification means 409 outputs acceptance.

(C) The output data sequence 107 contains only data corresponding to the elements accepted by the secret key knowledge verification means 402, secret random number knowledge verification means 404, and hash value coincidence verification means 408 and all these data.

[Operation of Mix-Net System]

First, initial setting processing 100 is executed in which a safety variable, an area variable of public key cryptography, a cryptographic hash function, and an encryption function of secret key cryptography are generated and published. Next, initial setting processing 320 of the substitution/decryption apparatus is executed in which the public key of each of the plurality of substitution/decryption apparatuses 112 is generated and published.

Participation processing is executed then in which each of the plurality of participant apparatuses 103 receives the safety variable, the area variable of public key cryptography, the cryptographic hash function, the encryption function of secret key cryptography, the public key of each of the plurality of substitution/decryption apparatuses 112, a plurality of secret keys of secret key cryptography, and a plaintext which is different for each participant apparatus 103 to generate data to be output to the substitution/decryption apparatuses through the consolidating apparatus 104. All the data obtained by participation processing are input to the consolidating apparatus 104 and consolidated. The result is output to one of the substitution/decryption apparatuses 112 as the input data sequence 105.

Next, substitution/decryption processing is executed in which each of the substitution/decryption apparatuses 112 receives the input data sequence 105 and the private key 106 of public key cryptography and generates the output data sequence 107 and the sequence of the authenticity proof text 108. At this time, the input data sequence 105 input to the first substitution/decryption apparatus 112 is the input data sequence 105 output from the consolidating apparatus 104. The input data sequence 105 input to each succeeding substitution/decryption apparatus 112 is the output data sequence 107 output from the immediately preceding substitution/decryption apparatus 112. The output data sequence 107 output from the final substitution/decryption apparatus 112 is the decryption result. The output data sequence 107 output from each substitution/decryption apparatus 112 except the final substitution/decryption apparatus 112 is an in-progress decryption result. The authenticity proof texts 108 output from all the substitution/decryption apparatuses 112 are defined as a global authenticity proof text. The decryption result, in-progress decryption results and the global authenticity proof text are output. The above-described processing is called integrated substitution/decryption processing.

Verification processing is executed then in which the input and output of each substitution/decryption apparatus 112 are separated from the decryption result, in-progress decryption results and the global authenticity proof text, the input data sequence 105, output data sequence 107, and authenticity proof text 108 in each substitution/decryption apparatus 112 are input to the verification apparatus 109, and the verification apparatus 109 outputs acceptance or unacceptance. Mix-net determination processing is executed in which the verification processing results for all substitution/decryption processing operations are collected, if all results indicate acceptance, acceptance is output as the entire system, and otherwise, unacceptance is output as the entire system.

The participant apparatus 103 can use, as the first input to the hash value encryption means 207, a random number, a date/time, or a value unique to a mix-net session, or data which combines these values, in addition to the plaintext 102.

1.2 Notation

The notation to be used will be described below. Let Hash( ) be a cryptographic hash function, q be a prime number, C be an elliptic curve with an order q, G be a point on C, enc[e]( ) be an encryption function of secret key cryptography, and dec[e]( ) be a decryption function. In this case, e indicates a secret key to be used for encryption or decryption. Let L be the number of bits in the range of the hash function, and L be the number of bits of a key of an encryption function of secret key cryptography. The number of bits of q is larger than L by at least 5. L is called a safety variable. Equation $X=[x]G$ represents that X is an x-fold point of G on the elliptic curve. When the addition symbol "+" is used for a point on the elliptic curve, it indicates an operation on the elliptic curve.

The mix-net system of the present invention, which can process a ciphertext with an arbitrary length and allows a third party to verify includes a plurality of substitution/decryption apparatuses, the participant apparatuses of a plurality of mix-net participants, the verification apparatus of a verification organization, and the consolidating apparatus of a consolidating organization. Let m be the number of substitution/decryption apparatuses, n be the number of participant apparatuses, $S^{(j)}$ be the jth substitution/decryption apparatus, and $U_i$ be the ith participant apparatus.

Let $\Psi$ be one-to-one mapping from an integral value of L bits to a point on the elliptic curve C, $\Phi$ be surjective mapping from a point on the elliptic curve to an integral value of L bits, and $\Phi \Box \Psi$ be identity mapping. Both $\Phi$ and $\Psi$ can be calculated efficiently. A detailed example of $\Phi$ is mapping which sets $e=\Phi(E)$ upon being given a point E and employs L bits from the x-coordinate of the point E. In this case, a detailed example of $\Psi$ is given the bit sequence e of L bits, sets e in the L lower bits of the x-coordinate of the point on the elliptic curve, and pads predetermined 0 to the remaining bits. It is checked whether a point having such an x-coordinate is present on C. If no point is present, the padding is changed in accordance with predetermined procedures, and the processing is executed until such an x-coordinate is found on C. If a point on C is found, it is defined as $\Psi(e)$. Since the L lower bits of the x-coordinate of the point ($\Psi(e)$) always continue to be e, $\Phi \Box \Psi(e)=e$ holds obviously, and $\Phi \Box \Psi$ is an identity mapping.

1.3 Detailed Example

The first embodiment will be described in detail with reference to FIGS. 1 to 4.

[Initial Setting]

An initial setting organization for initial setting determines and publishes, by using the initial 720 setting processing 100 implemented by a computer, a bit length $\Lambda$ of a plaintext, the safety variable L, the prime number q whose bit length is larger than L by 5, the elliptic curve C having the order q, the point G on C, a cryptographic hash function Hash( ) having the output bit length L, secret key cryptography using a key with the length L, an encryption function enc[e]( ) and decryption function dec[e] of the secret key cryptography, a function $\Psi( )$ from a bit sequence with L bits to a point on C, and mapping $\Phi( )$ from a point on C to a bit sequence with L bits. The prime number q, the elliptic curve C with the order q, and the point G on C are the area functions of the public key cryptography.

[Initial Setting of Substitution/Decryption Apparatus]

All the substitution/decryption apparatuses 112 execute the next initial setting processing. The initial setting means 320 (FIG. 3) in each of substitution/decryption apparatuses $S^{(j)}$ (j=1, . . . , m) uniformly selects a private key 106 $x^{(j)} \square Z/qZ$ at random and saves the private key in the substitution/decryption apparatus $S^{(j)}$. In addition, the initial setting means 320 generates and publishes a public key 101 $X^{(j)} = [x^{(j)}]G$.

The initial setting means 320 in each substitution/decryption apparatus $S^{(j)}$ uniformly selects $r^{(j)} \square Z/qZ$ at random and calculates $$\gamma^{(j)} = Hash(G, [r^{(j)}]X^{(j)})$$

$$\alpha^{(j)} = r^{(j)} - \gamma^{(j)} r^{(j)} \bmod q$$

and publishes $\gamma^{(j)}$ and $\alpha^{(j)}$ as a zero-knowledge proof text 321 of knowledge of $x^{(j)}$.

[Ciphertext Generation of Participant Apparatus]

For i=1, . . . , n, a participant apparatus 103 $U_i$ (FIG. 2) determines a plaintext 102 $M_i$ having the bit length $\Lambda$. As the first data 214, each participant apparatus 103 $U_i$ generates data containing $c_i^{(m+1)} = M_i$, $T_i^{(m+1)} = G$, and arbitrary data 203 (each containing arbitrary L-bit character strings $K_i^{(m+1)}$, $K_i'^{(m+1)}$, $S_i^{(m+1)}$, $S_i'^{(m+1)}$, and $P_i^{(m+1)}$ (processing 200). In addition, for j=1, . . . , m, a key generation means 204 uniformly selects elements $r[1]_i^{(j)}$, $r[2]_i^{(j)}$, $r[3]_i^{(j)}$, $r[4]_i^{(j)}$, and $r[5]_i^{(j)}$ of Z/qZ and a point $E_i^{(j)}$ on C at random.

Then, the key encryption means 205, data encryption means 206, hash value encryption means 207, knowledge concatenation means 208, proof text collection means 209, proof generation means 210, and output means 215 execute the following processing 213 repeatedly in the order of j=m, (m−1), . . . , and 1.

As the arbitrary character string, a random number, a number unique to a session, or a date/time is sometimes selected.

When a random number is used, the participant apparatus can confirm the presence of its plaintext from the final decrypted text set. When a number unique to a session or a date/time is used, it can be recognized that a ciphertext used for another session is not reused.

Encryption Processing by Key Encryption Means 205

To encrypt a secret key $e_i^{(j)}$ the key encryption means 205 obtains $E_i^{(j)}$ which satisfies $$e_i^{(j)} = \Phi(E_i^{(j)})$$

and calculates $$(K_i^{(j)}, K_i'^{(j)}) = ([r[1]_i^{(j)}]X^{(j)}, [r[1]_i^{(j)}]G + E_i^{(j)})$$

The calculation result is input to the output means 215.

Secret Key Knowledge Proof Text Generation Processing By Key Encryption Means 205

$$\gamma_i^{(j)} = Hash(K_i^{(j)}, K_i'^{(j)}, c_i^{(j)}, S_i^{(j)}, S_i'^{(j)}, T_i^{(j)}, T_i'^{(j)}, [r[4]_i^{(j)}]X^{(j)})$$

and $$\alpha_i^{(j)} = r[4]_i^{(j)} - \gamma_i^{(j)} r[1]_i^{(j)} \bmod q$$

are calculated, and the results are input to the proof text collection means 209.

Data Encryption Processing by Data Encryption Means 206

$$e_i^{(j)} = \Phi(E_i^{(j)})$$

and $$c_i^{(j)} = enc[e_i^{(j)}](K_i^{(j+1)}, K_i'^{(j+1)}, c_i^{(j+1)}, S_i^{(j+1)}, S_i'^{(j+1)}, T_i^{(j+1)}, T_i'^{(j+1)}, P_i^{(j+1)})$$

are calculated, and $c_i^{(j)}$ is input to the output means 215.

Hash Value Encryption Processing by Hash Value Encryption Means 207

$$(S_i^{(j)}, S_i'^{(j)}) = ([r[2]_i^{(j)}]X^{(j)}, [r[2]_i^{(j)}]G + \Psi(Hash(K_i^{(j+1)}, K_i'^{(j+1)}, c_i^{(j+1)}, S_i^{(j+1)}, S_i'^{(j+1)}, T_i^{(j+1)}, T_i'^{(j+1)}, P_i^{(j+1)}))))$$

is calculated to input $S_i^{(j)}$, $S_i'^{(j)}$ to the output means 215.

Knowledge Concatenation Processing by Knowledge Concatenation Means 208

$$(T_i^{(j)}, T_i'^{(j)}) = ([r[3]_i^{(j)}]X^{(j)}, [r[3]_i^{(j)}]G + T^{(j+1)})$$

is calculated to input $T_i^{(j)}$, $T_i'^{(j)}$ to the output means 215.

Random Number Knowledge Proof Text Generation Processing by Knowledge Concatenation Means 208

$$\gamma'_i^{(j)} = Hash(K_i^{(j)}, K_i'^{(j)}, S_i^{(j)}, S_i'^{(j)}, T_i^{(j)}, T_i'^{(j)}, [r[5]_i^{(j)}]X^{(j)})$$

and $$\alpha'_i^{(j)} = r[5]_i^{(j)} - \gamma'_i^{(j)} r[3]_i^{(j)} \bmod q$$

are calculated, and the results are input to the proof text collection means 209.

Collection Processing of Secret Key Knowledge Proof Text and Random Number Knowledge Proof Text by Proof Text Collection Means 209

The secret key knowledge proof texts $\gamma_i^{(j)}$ and $\alpha_i^{(j)}$ and the random number knowledge proof texts $\gamma'_i^{(j)}$ and $\alpha'_i^{(j)}$ are collected to generate a proof text $P_i^{(j)} = [\gamma_i^{(j)}, \alpha_i^{(j)}, \gamma'_i^{(j)}, \alpha'_i^{(j)}]$. If j=1 ($P_i^{(j)}$), it is output as part of a proof text 212.

Processing by Proof Generation Means 210

The element $r[4]_i^{(0)}$ of Z/qZ is uniformly selected at random. The following entire random number knowledge proof is calculated, and $P_i^{(0)}$ is output as part of the proof text.

$$\gamma'_i^{(0)} = Hash(K_i^{(1)}, K_i'^{(1)}, c_i^{(1)}, S_i^{(1)}, S_i'^{(1)}, S_i'^{(1)}, T_i^{(1)}, T_i'^{(1)}, [r[4]_i^{(0)}]G)$$

$$\alpha'_i^{(0)} = r[4]_i^{(0)} - \gamma'_i^{(0)} \Sigma j = 1 m r[3]_i^{(j)} \bmod q$$

$$P_i^{(0)} = [\gamma'_i^{(0)}, \alpha'_i^{(0)}]$$

Processing by Output Means 215

Data 214'($K_i^{(j)}$, $K_i'^{(j)}$, $c_i^{(j)}$, $S_i^{(j)}$, $S_i'^{(j)}$, $S_i'^{(j)}$, $T_i^{(j)}$, $T_i'^{(j)}$) is generated from the inputs $K_i^{(j)}$ and $K_i'^{(j)}$ from the key encryption means 205, the input $c_i^{(j)}$ from the data encryption means 206, the inputs $S_i^{(j)}$ and $S_i'^{(j)}$ from the hash value encryption means 207, and the inputs $T_i^{(j)}$ and $T_i'^{(j)}$ from the knowledge concatenation means 208. If j≠1, the data 214' is fed back as the data 214. If j=1, ($K_i^{(1)}$, $K_i'^{(1)}$, $c_i^{(1)}$, $S_i^{(1)}$, $S_i'^{(1)}$, $T_i^{(1)}$, $T_i'^{(1)}$) is output as the ciphertext 211.

That is, the participant apparatus 103 $U_i$ sends the ciphertext 211 ($K_i^{(1)}$, $K_i'^{(1)}$, $c_i^{(1)}$, $S_i^{(1)}$, $S_i'^{(1)}$, $S_i'^{(1)}$, $T_i^{(1)}$, $T_i'^{(1)}$) and the proof text $P_i^{(1)}$, $P_i^{(0)}$ to the consolidating apparatus 104 of the consolidating organization.

[Ciphertext Verification by Consolidating Apparatus]

For i=1, . . . , n, the consolidating apparatus 104 verifies the proof text for the entire data and confirms that $$\gamma' = Hash(K_i^{(1)}, K_i'^{(1)}, c_i^{(1)}, S_i^{(1)}, S_i'^{(1)}, T_i^{(1)}, T_i'^{(1)}, [\alpha'_i^{(0)}]G_i^{(1)} + [\gamma'_i^{(0)}]G)$$

holds.

The proof text for the entire data is sent to the verification apparatus 109 (FIG. 1; processing 110). For only i for which it can be confirmed that the proof text holds, $$K_i^{(1)}, K_i'^{(1)}, c_i^{(1)}, S_i^{(1)}, S_i'^{(1)}, T_i^{(1)}, T_i'^{(1)}, P_i^{(1)}, P_i^{(0)}$$

is sent to the first substitution/decryption apparatus (processing 105). In the example shown in FIG. 1, five data are input, and four data are output. The number of ciphertexts decreases from this point. The number after the decrease is also represented by n. The ciphertexts are assigned numbers i=1 to n. In the following description, $$K_i^{(j)}, K_i'^{(j)}, c_i^{(j)}, S_i^{(j)}, S_i'^{(j)}, T_i^{(j)}, T_i'^{(j)}, P_i^{(j)}$$

is generally different from the above-described value except when j=1.

[Shuffle and Decryption of Ciphertext by Substitution/Decryption Apparatus]

Sequentially for j=1, . . . , m, the substitution/decryption apparatus 112 $S^{(j)}$ executes the following calculation and verification.

The substitution/decryption apparatus 112 $S^{(j)}$ receives the input data sequence 105 containing the encrypted secret key 302 (abbreviated as a secret key ciphertext in FIG. 3) of secret key cryptography $$K_i^{(j)}, K_i'^{(j)}$$

the encrypted data 303 (abbreviated as a data ciphertext in FIG. 3)

$$c_i^{(j)}$$

the encrypted hash value 304 (hash value ciphertext in FIG. 3)

$$S_i^{(j)}, S_i'^{(j)}$$

the encrypted concatenated data 305 (abbreviated as a concatenated data ciphertext in FIG. 3)
ti $T_i^{(j)}, T_i'^{(j)}$
and the secret key knowledge proof text 301 (abbreviated as a key knowledge proof text in FIG. 3) and the secret random number knowledge proof text 306 (abbreviated as a random number knowledge proof text in FIG. 3)

$$P_i^{(j)}$$

The input data sequence 105 is divided into the elements 301 to 306 by the data division means 322.

The substitution/decryption apparatus 112 $S^{(j)}$ executes the following processing for all i (i=1, . . . , n).

The secret key knowledge verification means 307 confirms $$\gamma_i^{(j)} = \mathrm{Hash}(K_i^{(j)}, K_i'^{(j)}, c_i^{(j)}, S_i^{(j)}, S_i'^{(j)}, T_i^{(j)}, T_i'^{(j)}, [\alpha_i^{(j)}]X^{(j)} + [\gamma_i^{(j)}]K_i^{(j)})$$

The secret random number knowledge verification means 308 confirms $$\gamma_i'^{(j)} = \mathrm{Hash}(K_i^{(j)}, K_i'^{(j)}, c_i^{(j)}, S_i^{(j)}, S_i'^{(j)}, T_i^{(j)}, T_i'^{(j)}, [\alpha_i'^{(j)}]X^{(j)} + [\gamma_i'^{(j)}]K_i^{(j)})$$

For i for which the equation does not hold, the data is not added to the final output data sequence.

The number of ciphertexts decreases here, too. The number after the decrease is also represented by n. The ciphertexts are assigned numbers i=1 to n.

The secret key decryption means 310 inputs $$E_i^{(j)} = K_i^{(j)} - [1/x^{(j)}]K_i^{(j)}$$

to the data decryption means 313.

The data decryption means 313 calculates $$e_i^{(j)} = \Phi(E_i^{(j)})$$

$$(K_i^{(j+1)}, K_i'^{(j+1)}, c_i^{(j+1)}, S_i^{(j+1)}, S_i'^{(j+1)}, T_i^{(j+1)}, P_i^{(j+1)}) = dec[e_i^{(j)}](c_i^{(j)})$$

The hash value decryption means 312 calculates $$H_i^{(j)} = S_i'^{(j)} - [1/x^{(j)}]S_i^{(j)}$$

The concatenated data decryption means 314 calculates $$T_i'^{(j)} = T_i'^{(j)} - [1/x^{(j)}]T_i^{(j)}$$

The obtained data sequence is $$(K_i^{(j+1)}, K_i'^{(j+1)}, c_i^{(j+1)}, S_i^{(j+1)}, S_i'^{(j+1)}, T_i^{(j+1)}, P_i^{(j+1)}, H_i^{(j+1)}, T_i'^{(j+1)}).$$

The substitution means 311 uniformly selects substitution $\pi[j]()$ from $[1, \ldots, n]$ to $[1, \ldots, n]$ and executes the following substitution processing.

$$K_i^{(j+1)} = K\pi[j](i)^{(j+1)}$$

$$K_i'^{(j+1)} = K'\pi[j](i)^{(j+1)}$$

$$c_i^{(j+1)} = c\pi[j](i)^{(j+1)}$$

$$S_i^{(j+1)} = S\pi[j](i)^{(j+1)}$$

$$S_i'^{(j+1)} = S'\pi[j](i)^{(j+1)}$$

$$T_i'^{(j+1)} = T'\pi[j](i)^{(j+1)}$$

$$P_i^{(j+1)} = P\pi[j](i)^{(j+1)}$$

$$H_i^{(j+1)} = H\pi[j](i)^{(j+1)}$$

$$T_i'^{(j+1)} = T'\pi[j](i)^{(j+1)}$$

The hash value decryption authenticity proof means 315 generates a proof (hash value decryption authenticity is generated correctly.

The concatenated data decryption authenticity proof means 316 generates a proof (concatenated data decryption authenticity proof text) to prove that $T_i'^{(j+1)}$ is generated correctly.

The proof can be done by using, e.g., a method of reference "An Implementation of a Universally Verifiable Electronic Voting Scheme based on Shuffling, Financial Cryptography 2002".

For all i (i=1, . . . , m), the hash value verification means 317 confirms that $$\Phi(H_i^{(j)}) = \mathrm{Hash}(K_i^{(j+1)}, K_i'^{(j+1)}, c_i^{(j+1)}, S_i^{(j+1)}, S_i'^{(j+1)}, T_i^{(j+1)}, T_i'^{(j+1)}, P_i^{(j+1)})$$

holds. If i for which the equation does not hold is present, the hash value unacceptance authenticity proof means 318 clarifies $\pi[j](i)$, $E_i^{(j)}$ for i and generates a zero-knowledge proof (hash value unacceptance authenticity proof text) to prove that $E_i^{(j)}$ is correctly generated. The number of ciphertexts decreases here, too (processing 319). The number after the decrease is also represented by n. The ciphertexts are assigned numbers i=1 to n.

Finally, the output data sequence 107 ($K_i^{(j+1)}$, $K_i'^{(j+1)}$, $c_i^{(j+1)}$, $S_i^{(j+1)}$, $S_i'^{(j+1)}$, $T_i^{(j+1)}$, $T_i'^{(j+1)}$, $P_i^{(j+1)}$, $H_i^{(j)}$) is sent to the next substitution/decryption apparatus $S_i^{(j+1)}$.

The hash value decryption authenticity proof text, concatenated data decryption authenticity proof text, and the hash value unacceptance authenticity proof text are sent to the verification apparatus 109 as the authenticity proof text 108.

When the processing is ended for all the substitution/decryption apparatuses $S^{(j)}$ (j=1, . . . , m), a plaintext 111 $[M_{i}]_{i=1,\ldots,n}$ in which data are shuffled is obtained.

[Processing by Verification Apparatus]

The verification apparatus 109 of the verifier receives the authenticity proof text 108 containing the hash value decryption authenticity proof text 401 (abbreviated as a hash value proof text in FIG. 4), concatenated data decryption authenticity proof text 403 (abbreviated as a concatenation proof text in FIG. 4), and hash value unacceptance authenticity proof text 400 (abbreviated as an unacceptance proof text in FIG. 4), the input data sequence 105, the output data sequence 107, and the entire random number knowledge proof text 110.

For all i, a verification means 500 for verifying the entire random number knowledge proof text 110 confirms that $$\gamma_i'^{(j)} = \text{Hash}(K_i^{(1)}, K_i'^{(1)}, c_i^{(1)}, S_i^{(1)}, S_i'^{(1)}, T_i^{(1)}, T_i'^{(1)}, [\alpha_i'^{(0)}]G_i^{(1)} + [\gamma_i'^{(0)}]G)$$

holds.

For all j=1, . . . , m, the following calculation 995 and verification are done sequentially. For all i (i=1, . . . , n), the verification means 402 for executing secret key knowledge verification processing confirms $$\gamma_i^{(j)} = \text{Hash}(K_i^{(1)}, K_i'^{(1)}, c_i^{(1)}, S_i^{(1)}, S_i'^{(1)}, T_i^{(1)}, T_i'^{(1)}, [\alpha_i^{(j)}]X^{(j)} + [\gamma_i^{(j)}]K_i^{(j)})$$

The verification means 404 for executing secret random number knowledge verification processing confirms $$\gamma_i'^{(j)} = \text{Hash}(K_i^{(1)}, K_i'^{(1)}, c_i^{(1)}, S_i^{(1)}, S_i'^{(1)}, T_i^{(1)}, T_i'^{(1)}, [\alpha_i'^{(j)}]X^{(j)} + [\gamma_i'^{(j)}]T_i^{(j)})$$

For only i for which the equation does not hold, the subsequent processing is not executed.

The verification means 406 for executing hash value decryption authenticity verification processing verifies that $[H_1^{(j)}]_{i=1,\ldots,n}$ is correctly generated (a method corresponding to proof and, for example, the method of the above-described reference is used).

The verification means 407 for concatenated data decryption authenticity verification processing verifies that $\{T_1'^{(j+1)}\}_{i=1,\ldots,n}$ is correctly generated (a method corresponding to proof and, for example, the method of the above-described reference is used).

For all i (i=1, . . . , n), the comparison means 408 for executing hash value coincidence verification processing confirms that $$\Phi(H_i^{(j)}) = \text{Hash}(K_i^{(j+1)}, K_i'^{(j+1)}, c_i^{(j+1)}, S_i^{(j+1)}, S_i'^{(j+1)}, T_i^{(j+1)}, T_i'^{(j+1)}, P_i^{(j+1)})$$

holds. If i for which the equation does not hold is present, the verification means 409 for executing hash value unacceptance authenticity verification processing verifies that $\pi[j](i)$, $E_1^{(j)}$ for i is clarified, and equation $E_1^{(j)}$ is correctly generated and confirms that $c\pi[j](i)^{(j)}$ is correctly decrypted.

The verification means 405 for executing authenticity determination outputs acceptance when, for all data for which both the verification means 402 for executing secret key knowledge verification processing and the verification means 404 for executing secret random number knowledge verification processing output acceptance, both the verification means 406 for executing hash value decryption authenticity verification processing and the verification means 407 for executing concatenated data decryption authenticity processing means 407 output acceptance, and the comparison means 408 for executing hash value coincidence verification processing outputs acceptance, or the comparison means 408 for executing hash value coincidence verification processing outputs unacceptance while the verification means 409 for executing hash value unacceptance authenticity verification processing outputs acceptance, and the output data sequence contains only data corresponding to the elements accepted by the secret key knowledge verification processing, secret random number knowledge verification processing, and hash value coincidence verification processing and all the data. Otherwise, unacceptance is output.

2 Second Embodiment 2.1

The outline of the second embodiment will be described with reference to FIGS. 1, 5, 6, and 7.

As shown in FIG. 1, a mix-net system according to this embodiment includes a plurality of participant apparatuses 103, a consolidating apparatus 104, a plurality to substitution/decryption apparatuses 112, and a verification apparatus 109. The participant apparatus 103 has an arrangement shown in FIG. 5, which is the same as the participant apparatus of the first embodiment except that the apparatus of the second embodiment has neither knowledge concatenation means 208 nor random number knowledge proof means 210. The consolidating apparatus 104 is also the same as that of the first embodiment.

[Substitution/Decryption Apparatus]

Figure 6:
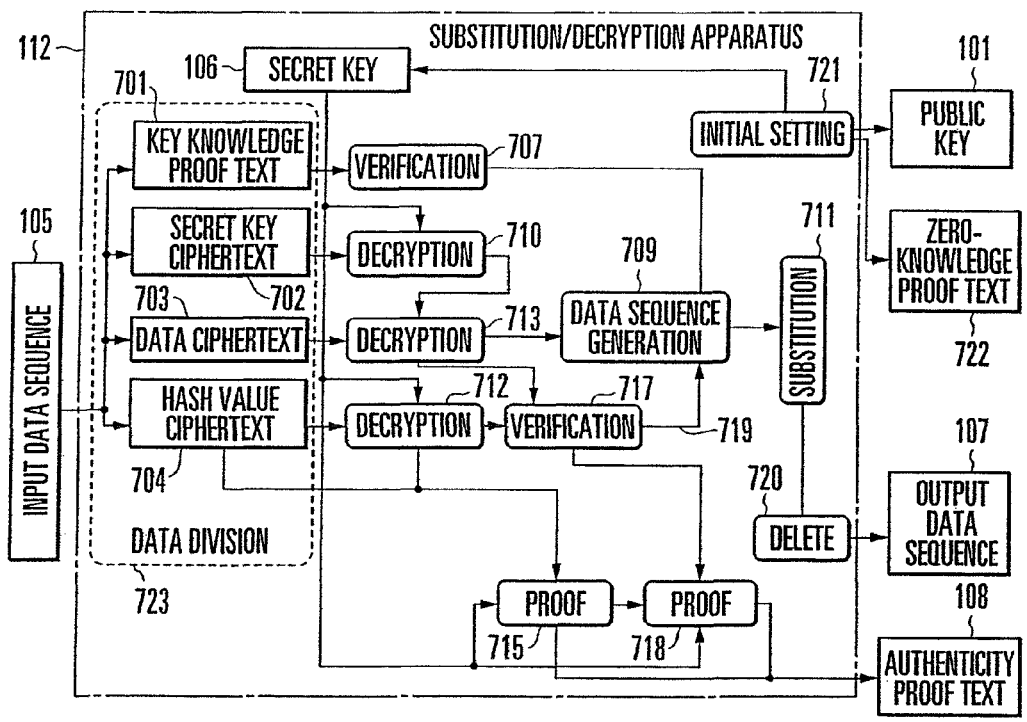
FIG. 6 is a block diagram showing an arrangement example of a substitution/decryption apparatus according to the second embodiment of the present invention.

As shown in FIG. 6, the substitution/decryption apparatus 112 has a data division means 723, secret key knowledge verification means 707, secret key decryption means 710, data decryption means 713, hash value decryption means 712, hash value verification means 717, output data sequence generation means 711, redundant data delete confirmation means 720, hash value decryption authenticity proof means 715, hash value unacceptance authenticity proof means 718, and output means.

The data division means 723 divides each element of an input data sequence 105 input from the consolidating apparatus 104 or another substitution/decryption apparatus into a secret key 702 of secret key cryptography, which is encrypted by public key cryptography, data 703 encrypted by secret key 1085 cryptography, a hash value 704 encrypted by public key cryptography, and a proof text 701 of knowledge of the encrypted secret key.

The output data sequence generation means 711 generates a data sequence which contains, as sequence elements, only output data for which acceptance is output from all of the hash value verification means 717 and secret key knowledge verification means 707 and which are corresponding in a sense of being generated from the same element data of the input data sequence 105. The output data sequence generation means 711 also uniformly shuffles the elements at random to form an output data sequence 107. When the elements of the output data sequence 107 are redundant, and it is confirmed that the redundant data is deleted by subsequent processing, the redundant data delete confirmation means 720 outputs acceptance. Otherwise, unacceptance is output.

When the decrypted concatenated data contained in each element of the output data sequence 107 is always data obtained by decrypting encrypted concatenated data contained in a certain element of the input data sequence 105, and the hash value verification means 717 outputs unacceptance, the hash value unacceptance authenticity proof means 715 generates a hash value unacceptance authenticity proof text which proves that output of unacceptance is authentic. The output means creates an authenticity proof text 108 from the hash value decryption authenticity proof text and hash value unacceptance authenticity proof text and outputs the authenticity proof text 108 and the output data sequence 107 output from the output data sequence generation means 711. The remaining components are the same as in the substitution/decryption apparatus of the first embodiment.

[Verification Apparatus]

As shown in FIG. 7, the verification apparatus 109 has a secret key knowledge verification means 802, hash value decryption authenticity verification means 806, hash value coincidence verification means 808, hash value unacceptance authenticity verification means 809, and authenticity determination means 805.

For, of the elements of the input data sequence 105, all elements accepted by the secret key knowledge verification means 402, the authenticity determination means 805 outputs acceptance if all the following conditions are satisfied. Otherwise, unacceptance is output.

(A) The hash value decryption authenticity verification means 806 outputs acceptance.
(B) The hash value coincidence verification means 808 outputs acceptance, or the hash value coincidence verification means 808 outputs unacceptance while the hash value unacceptance authenticity verification means 809 outputs acceptance.
(C) The output data sequence 107 contains only data corresponding to the elements accepted by the secret key knowledge verification means 802 and hash value coincidence verification means 808 and all these data.

The remaining components are the same as in the verification apparatus of the first embodiment.

The operation of the mix-net system is the same as in the first embodiment, and a description thereof will be omitted.

2.2 Detailed Example

The second embodiment will be described in detail with reference to FIGS. 1, 5, 6, and 7.

[Initial Setting]

An initial setting apparatus 100 determines and publishes a bit length $\Lambda$ of a plaintext, a safety variable L, a prime number q whose bit length is larger than L by 5, an elliptic curve C having the order q, a point G on C, a cryptographic hash function Hash( ) having the output bit length L, secret key cryptography using a key with the length L, an encryption function enc[e]( ) and decryption function dec[e] of the secret key cryptography, a function $\Psi$( ) from a bit sequence with L bits to a point on C, and mapping $\Phi$( ) from a point on C to a bit sequence with L bits.

[Initial Setting of Substitution/Decryption Apparatus]

All the substitution/decryption apparatuses $S^{(j)}$ (j=1, ..., m) execute the next initial setting processing. An initial setting means 721 (FIG. 6) in each of substitution/decryption apparatuses $S^{(j)}$ uniformly selects a private key $106 x^{(j)} \square Z/qZ$ at random and saves the private key in the substitution/decryption apparatus $S^{(j)}$. In addition, the initial setting means 721 generates and publishes a public key 101 $X^{(j)}=[x^{(j)}]G$. The initial setting means 721 in each substitution/decryption apparatus $S^{(j)}$ uniformly selects $r^{(j)} \square Z/qZ$ at random and calculates $$\gamma^{(j)}=\text{Hash}(G,[r^{(j)}]X^{(j)}) \text{ and}$$

$$\alpha^{(j)}=r^{(j)}-\gamma^{(j)}r^{(j)} \bmod q$$

and publishes $\gamma^{(j)}$ and $\alpha^{(j)}$ as a zero-knowledge proof text 722 of knowledge of $x^{(j)}$.

[Ciphertext Generation of Participant Apparatus]

For i=1, ..., n, a participant apparatus 103 $U_i$ (FIG. 5) determines a plaintext 102 $M_i$ having the bit length $\Lambda$. As first data 614, each participant apparatus $U_i$ 103 generates data containing $c_i^{(m+1)}=M_i$ and arbitrary data 603 (each containing arbitrary L-bit character strings $K_i^{(m+1)}$, $K_i'^{(m+1)}$, $S_i^{(m+1)}$, $S_i'^{(m+1)}$ and $P_i^{(m+1)}$). In addition, for j=1, ..., m, a key generation means 604 uniformly selects elements $r[1]_i^{(j)}$, $r[2]_i^{(j)}$, and $r[3]_i^{(j)}$ of Z/qZ and a point $E_i^{(j)}$ on C at random.

Then, a key encryption means 605, data encryption means 606, hash value encryption means 607, and output means 615 execute following processing 613 repeatedly in the order of j=m, (m-1), ..., and 1.

As in the first embodiment, as the arbitrary character string, a random number, a number unique to a session, or a date/time is sometimes selected. When a random number is used, the participant apparatus can confirm the presence of its plaintext from the final decrypted text set. When a number unique to a session or a date/time is used, it can be recognized that a ciphertext used for another session is not reused.

Secret Key Encryption Processing by Key Encryption Means 605

To encrypt a secret key $e_i^{(j)}$, the key encryption means 605 obtains $E_i^{(j)}$ which satisfies $$e_i^{(j)}=\Phi(E_i^{(j)})$$

and calculates $$(K_i^{(j)},K_i'^{(j)})=([r[1]_i^{(j)}]X^{(j)},[r[1]_i^{(j)}]G+E_i^{(j)})$$

The calculation result $K_i^{(j)}$, $K_i'^{(j)}$ is input to the output means 615.

Secret Key Knowledge Proof Text Generation Processing By Key Encryption Means 605

$$\gamma_i^{(j)}=\text{Hash}(K_i^{(j)},K_i'^{(j)},c_i^{(j)},S_i^{(j)},S_i'^{(j)},[r[3]_i^{(j)}]X^{(j)},$$

$$\alpha_i^{(j)}=r[3]_i^{(j)}-\gamma_i^{(j)}r[1]_i^{(j)} \bmod q, \text{ and}$$

$$P_i^{(j)}=[\gamma_i^{(j)},\alpha_i^{(j)}]$$

are calculated, and $P_i^{(1)}$ and $P_i^{(0)}$ are sent to the consolidating apparatus 104 as a secret key knowledge proof text 612.

Data Encryption Processing by Data Encryption Means 606

$$e_i^{(j)}=\Phi(E_i^{(j)})$$

and $$c_i^{(j+1)}=\text{enc}[e_i^{(j)}](K_i^{(j+1)},K_i'^{(j+1)},c_i^{(j+1)},S_i^{(j+1)},S_i'^{(j+1)},P_i^{(j+1)})$$

are calculated, and $c_i^{(j)}$ is input to the output means 215.

Hash Value Encryption Processing by Hash Value Encryption Means 607

$$(S_i^{(j)},S_i'^{(j)})=([r[2]_i^{(j)}]X^{(j)},[r[2]_i^{(j)}]G+\Psi(\text{Hash }(K_i^{(j+1)},K_i'^{(j+1)},c_i^{(j+1)},S_i^{(j+1)},S_i'^{(j+1)},P_i^{(j+1)})))$$

is calculated to input $S_i^{(j)}$, $S_i'^{(j)}$ is input to the output means 615.

Processing by Output Means 615

Data 614' ($K_i^{(j)}$, $K_i'^{(j)}$, $c_i^{(j)}$, $S_i^{(j)}$, $S_i'^{(j)}$) is generated from the inputs $K_i^{(j)}$ and $K_i'^{(j)}$ from the key encryption means 205, the input $c_i^{(j)}$ from the data encryption means 206, and the inputs $S_i^{(j)}$ and $S_i'^{(j)}$ from the hash value encryption means 207. If j≠1, the data 614' is fed back as the data 614. If j=1, ($K_i^{(j)}$, $K_i'^{(j)}$, $c_i^{(j)}$, $S_i^{(j)}$, $S_i'^{(j)}$) is output as a ciphertext 211.

That is, the participant apparatus 103 $U_i$ sends the ciphertext 611 ($K_i^{(j)}$, $K_i'^{(j)}$, $c_i^{(j)}$, $S_i^{(j)}$, $S_i'^{(j)}$) and the proof text $P_i^{(1)}$, $P_i^{(0)}$ to the consolidating apparatus 104.

[Ciphertext Verification by Consolidating Apparatus]

The consolidating apparatus 104 consolidates data collected from the participant apparatuses and sends them to the first substitution/decryption apparatus. $K_i^{(j)}$, $K_i'^{(j)}$, $c_i^{(j)}$, $S_i^{(j)}$, $S_i'^{(j)}$, $P_i^{(j)}$ is generally different from the above-described value except when j=1.

[Shuffle and Decryption of Ciphertext by Substitution/Decryption Apparatus]

Sequentially for j=1, ..., m, the substitution/decryption apparatus 112 $S^{(j)}$ executes the following calculation and verification.

The input data sequence 105 containing the encrypted secret key 702 (abbreviated as a secret key ciphertext in FIG. 6) of secret key cryptography $$K_i^{(j)}, K_i'^{(j)}$$

the encrypted data 703 (abbreviated as a data ciphertext in FIG. 6)

$$c_i^{(j)}$$

the encrypted hash value 704 (abbreviated as a hash value ciphertext in FIG. 6)

$$S_i^{(j)}, S_i'^{(j)}$$

and the secret key knowledge proof text 701 (abbreviated as a key knowledge proof text in FIG. 6)

$$P_i^{(j)}$$

and
private key 106

$$x^{(j)}$$

is input. The input data sequence 105 is divided into the elements 701 to 704 by the data division means 723.

The following processing is executed for all i (i=1, ..., n).
The secret key knowledge verification means 707 confirms $$\gamma_i^{(j)} = \text{Hash}(K_i^{(j)}, K_i'^{(j)}, c_i^{(j)}, S_i^{(j)}, S_i'^{(j)}, [\alpha_i^{(j)}]X^{(j)} + [\gamma_i^{(j)}]K_i^{(j)})$$

For i for which the equation does not hold, the data is not added to the final output data sequence (processing 709).

The number of ciphertexts decreases here. The number after the decrease is also represented by n. The ciphertexts are assigned numbers i=1 to n.

The secret key decryption means 710 calculates $$E_i^{(j)} = K_i'^{(j)}[1/x^{(j)}]K_i^{(j)}.$$

The data decryption means 313 calculates $$e_i^{(j)} = \Phi(E_i^{(j)})$$

$$\left(K_i^{(j+1)}, K_i'^{(j+1)}, c_i^{(j+1)}, S_i^{(j+1)}, S_i'^{(j+1)}, P_i^{(j+1)}\right) = dec\left[e_i^{(j)}\right]\left(c_i^{(j)}\right)$$

The obtained data sequence is $$(K_i^{(j+1)}, K_i'^{(j+1)}, c_i^{(j+1)}, S_i^{(j+1)}, S_i'^{(j+1)}, P_i^{(j+1)}).$$

The substitution means 711 uniformly selects substitution $\pi[j]()$ from [1, ..., n] to [1, ..., n] and executes the following substitution processing.

$$K_i^{(j+1)} = K\pi[j](i)^{(j+1)}$$

$$K_i'^{(j+1)} = K'\pi[j](i)^{(j+1)}$$

$$c_i^{(j+1)} = c\pi[j](i)^{(j+1)}$$

$$S_i^{(j+1)} = S\pi[j](i)^{(j+1)}$$

$$S_i'^{(j+1)} = S'\pi[j](i)^{(j+1)}$$

$$P_i^{(j+1)} = P\pi[j](i)^{(j+1)}$$

The hash value decryption means 712 and substitution means 711 execute operation given by $$H_i^{(j)} = S'\pi[j](i)^{(j)} - [1/x^{(j)}]S\pi[j](i)^{(j)}$$

The hash value decryption authenticity proof means 715 generates a proof (hash value decryption authenticity proof text) to prove that $H_i^{(j)}$ is generated correctly. For this proof, the method of the above-described reference is used.

For all i (i=1, ..., m), the hash value verification means 717 confirms that $$\Phi(H_i^{(j)}) = \text{Hash}(K_i^{(j+1)}, K_i'^{(j+1)}, c_i^{(j+1)}, S_i^{(j+1)}, S_i'^{(j+1)}, P_i^{(j+1)})$$

holds.

If i for which the equation does not hold is present, the hash value unacceptance authenticity proof means 718 clarifies $\pi[j](i)$, $E_i^{(j)}$ for i and generates a zero-knowledge proof (hash value unacceptance authenticity proof text) to prove that $E_i^{(j)}$ is correctly generated.

The number of ciphertexts decreases here, too (processing 719). The number after the decrease is also represented by n. The ciphertexts are assigned numbers i=1 to n.

The redundant data delete confirmation means 720 confirms that, for i=1, ... n, the sets of ($K_i^{(j+1)}$, $K_i'^{(j+1)}$, $c_i^{(j+1)}$, $S_i^{(j+1)}$, $S_i'^{(j+1)}$, $P_i^{(j+1)}$) are not redundant. If redundant sets are present, sets except one are erased. The number of ciphertexts decreases here, too. The number after the decrease is also represented by n. The ciphertexts are assigned numbers i=1 to n.

Finally, the output data sequence 107

$$K_i^{(j+1)}, K_i'^{(j+1)}, c_i^{(j+1)}, S_i^{(j+1)}, S_i'^{(j+1)}, P_i^{(j+1)}, H_i^{(j)}$$

is sent to the next substitution/decryption apparatus $S_i^{(j+1)}$.

The hash value decryption authenticity proof text and the hash value unacceptance authenticity proof text are sent to the verification apparatus 109 as the authenticity proof text 108.

When the processing is ended for all the (I) substitution/decryption apparatuses $S^{(j)}$ (j=1, ..., m), a plaintext 111 $[M_i]_{i=1, ..., n}$ in which data are shuffled is obtained.

[Processing by Verification Apparatus]

The verification apparatus 109 receives the authenticity proof text 108 containing a hash value decryption authenticity proof text 801 (abbreviated as a hash value proof text in FIG. 7) and a hash value unacceptance authenticity proof text 800 (abbreviated as an unacceptance proof text in FIG. 7), the input data sequence 105, and the output data sequence 107.

For all j=1, ..., m, the following calculation and verification are done sequentially. For all i (i=1, ..., n), the secret key knowledge verification means 802 confirms $$\gamma_i^{(j)} = \text{Hash}(K_i^{(j)}, K_i'^{(j)}, c_i^{(j)}, S_i^{(j)}, S_i'^{(j)}, [\alpha_i^{(j)}]X^{(j)} + [\gamma_i^{(j)}]K_i^{(j)})$$

For only i for which the equation does not hold, the subsequent processing is not executed.

The hash value decryption authenticity verification means 806 verifies that $[H_i^{(j)}]_{i=1, ..., n}$ is correctly generated (a method corresponding to proof and, for example, the method of the above-described reference is used).

For all i (i=1, ..., n), the comparison means 808 for executing hash value coincidence verification processing confirms that $$\Phi(H_i^{(j)}) = \text{Hash}(K_i^{(j+1)}, K_i'^{(j+1)}, c_i^{(j+1)}, S_i^{(j+1)}, S_i'^{(j+1)}, P_i^{(j+1)})$$

holds.

If i for which the equation does not hold is present, the hash value unacceptance authenticity verification means 809 verifies that $\pi[j](i)$, $E_i^{(j)}$ for i is clarified, and equation $E_i^{(j)}$ is correctly generated and confirms that $c\pi[j](i)^{(j)}$ is correctly decrypted.

The verification means 805 for executing authenticity determination outputs acceptance when, for all data for which both secret key knowledge verification processing and secret random number knowledge verification processing output acceptance, both hash value decryption authenticity verification processing outputs acceptance while hash value coincidence verification processing outputs acceptance, or hash value coincidence verification processing outputs unacceptance while hash value unacceptance authenticity verification processing outputs acceptance, and the output data sequence contains only data corresponding to the elements accepted by the secret key knowledge verification processing, secret random number knowledge verification processing, and hash value coincidence verification processing and all the data except redundant sets in $[K_i^{(j+1)}, K_i'^{(j+1)}, c_i^{(j+1)}, S_i^{(j+1)}, S_i'^{(j+1)}, P_i^{(j+1)}]$. Otherwise, unacceptance is output.

[Reason why Present Invention is Effective]

To prove that the decryption and substitution $dec[e_i^{(j)}](c\pi[j](i)^{(j)})[j](i)^{(j)})$ of data by the substitution/decryption apparatus is authentic, that the hash value, $dec[e_i^{(j)}](c\pi[j](i)^{(j)})$, and the decryption result of the ciphertext by the public key generated by the participant apparatus 103 equal is proved. This proof processing is hash value decryption proof processing. That the proof processing is executed in an open verification enable form is the main reason why the present invention allows open verification.

However, the effect of the above-described proof is obtained only when the participant apparatus correctly generates a hash value ciphertext. The substitution/decryption apparatus must prove the authenticity of its operation without the above generation.

First, it is confirmed by hash value verification processing whether the participant apparatus has generated a hash value ciphertext by authentic processing. If no authentic processing is executed, it is proved by hash value unacceptance authenticity proof processing that the participant apparatus is unauthorized. With this processing, the authenticity of processing of the substitution/decryption apparatus is proved.

However, the processing of the participant apparatus is sometimes unauthorized by illicit processing of another participant apparatus. That is, data of one participant apparatus is copied by another participant apparatus which generates appropriate data on the basis of the ciphertext. In this case, the substitution/decryption apparatus decrypts the ciphertext of the participant apparatus and proves the authenticity of the decryption because the participant apparatus is unauthentic. This proof may be an attack on the ciphertext of the participant apparatus.

If a participant apparatus illicitly processes its ciphertext, the attack occurs as a natural result. However, if the data is copied by a third party, this attack must be prevented. As a defensive measure, secret key knowledge proof processing is executed. With this processing, when an illicit ciphertext is created from the ciphertext of another person, processing is rejected first by substitution/decryption processing.

When the ciphertext of another person is copied and illicitly processed, processing is rejected by the substitution/decryption apparatus, as described above. However, if the ciphertext is simply copied and used without any particular processing, processing is not rejected by the above-described method. If this is permitted, the copied ciphertext is decrypted a plurality of number of times. When such a phenomenon occurs, the contents of the copied ciphertext can be known by finding a plurality of identical plaintexts from the finally decrypted plaintexts. Processing of preventing such an attack on privacy is the proof processing for concatenated data in the first embodiment or the processing of deleting redundant data in the second embodiment.

If concatenated data is not generated by the apparatus, proof cannot be created finally. Hence, simple copy can be prevented. Deleting redundant data corresponds to processing of directly deleting copied data.

The participant apparatus sometimes inputs a character string such as a random number, a number unique to a session, or a date/time in addition to a plaintext. These values are decrypted finally. Various things can be confirmed by using the decrypted character strings. For example, when a random number is used, the participant apparatus can confirm the presence of its plaintext from the final decrypted text set. When a number unique to a session or a date/time is input, it can be recognized that a ciphertext used for another session is not reused.

The invention claimed is:

1. A participant encryption apparatus, comprising:
   a key encryption processor that encrypts one secret key in a plurality of secret keys of secret key cryptography using one public key of a plurality of public keys, wherein each public key corresponds to one of a plurality of substitution/decryption apparatuses;
   a data encryption processor that encrypts given data using one secret key in the plurality of secret keys;
   a hash value encryption processor that calculates a hash value of the given data by using a cryptographic hash function and encrypting the hash value by one public key in the plurality of public keys;
   a processor that provides plaintext as a first input to said data encryption processor and subsequently and repeatedly inputs data to said data encryption processor, wherein the data is provided from preceding outputs from said data encryption processor, said key encryption unit processor, and said hash value encryption processor, wherein the processor inputs the plaintext and data to said data encryption unit processor a number of times equal to the number of substitution/decryption apparatuses; and
   a transmitter for outputting encrypted data from said processor.

2. The participant encryption apparatus according to claim 1, wherein said key encryption processor further generates a proof text of knowledge of the encrypted one secret key.

3. The participant encryption apparatus according to claim 2, further comprising:
   a knowledge concatenation encrypting processor that encrypts the given data by one public key in the plurality of public keys and generates a proof text of knowledge of a secret random number used for the encryption,
   wherein said processor inputs the plaintext as the first input to said data encryption processor and repeatedly inputs, as subsequent inputs to said data encryption processor, preceding outputs from said data encryption processor, said key encryption processor, said hash value encryption processor, and said knowledge concatenation encryption processor,
   wherein the processor inputs the plaintext and data to said data encryption processor a number of times equal to the number of substitution/decryption apparatuses; and
   a total random number knowledge proof processor that generates a proof text of knowledge of a sum of the secret random numbers used to encrypt data by said knowledge concatenation encryption processor during the repeated inputs of data thereto.

4. The participant apparatus according to claim 1, wherein said transmitter outputs, together with the data output from the data encryption processor after the number of times input by the processor, data to prove that the apparatus is an authentic participant apparatus.

* * * * *